(12) United States Patent
Takeuchi et al.

(10) Patent No.: US 11,313,735 B2
(45) Date of Patent: Apr. 26, 2022

(54) THERMISTOR SINTERED BODY AND TEMPERATURE SENSOR ELEMENT

(71) Applicant: SHIBAURA ELECTRONICS CO., LTD., Saitama (JP)

(72) Inventors: Akitaka Takeuchi, Saitama (JP); Naohiro Niizeki, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 16/764,749

(22) PCT Filed: Oct. 17, 2019

(86) PCT No.: PCT/JP2019/040840
§ 371 (c)(1),
(2) Date: May 15, 2020

(87) PCT Pub. No.: WO2020/090489
PCT Pub. Date: May 7, 2020

(65) Prior Publication Data
US 2021/0372860 A1 Dec. 2, 2021

(30) Foreign Application Priority Data
Oct. 31, 2018 (JP) .............................. JP2018-204562

(51) Int. Cl.
*G01K 7/22* (2006.01)
*C04B 35/505* (2006.01)
(Continued)

(52) U.S. Cl.
CPC .............. *G01K 7/22* (2013.01); *C04B 35/505* (2013.01); *H01C 7/045* (2013.01); *H01C 7/06* (2013.01);
(Continued)

(58) Field of Classification Search
CPC .... H01C 7/045; H01C 7/06; H01C 17/06533; G01K 7/22; C04B 35/505
See application file for complete search history.

(56) References Cited

U.S. PATENT DOCUMENTS

| 3,975,307 A | * | 8/1976 | Matsuo | ..................... H01B 1/08 252/520.21 |
| 5,749,656 A | * | 5/1998 | Boehm | ..................... G01K 7/22 338/28 |

(Continued)

FOREIGN PATENT DOCUMENTS

| JP | 2001-143907 A | 5/2001 |
| JP | 2002057003 A | 2/2002 |

(Continued)

OTHER PUBLICATIONS

Office action for CN application No. 20198005192.6 dated Oct. 10, 2010.

(Continued)

*Primary Examiner* — Kyung S Lee
(74) *Attorney, Agent, or Firm* — Pearne & Gordon LLP

(57) ABSTRACT

A thermistor sintered body and a temperature sensor element that can adjust a resistance value in a wider range while suppressing an influence on a B constant. A thermistor sintered body of the present invention includes: a $Y_2O_3$ phase as a main phase; and a $Y(Cr/Mn)O_3$ phase as a subphase, wherein a chemical composition of Cr, Mn, Ca, Pr and Y excluding oxygen includes one or two of Cr: 20 mol % or less and Mn: 20 mol % or less, Ca: 1 to 15 mol %, and Pr: 0.5 to 30 mol %, with the balance being unavoidable impurities and Y. In the present invention, preferably, the subphase is a $Y(Cr,Mn)O_3$ phase or a $YCrO_3$ phase, and Pr is dissolved in the $Y(Cr,Mn)O_3$ phase or the $YCrO_3$ phase.

9 Claims, 10 Drawing Sheets

$Y_2O_3$ PHASE: 1
$Y(Cr,Mn)O_3$ PHASE: 2

(51) Int. Cl.
*H01C 7/04* (2006.01)
*H01C 7/06* (2006.01)
*H01C 17/065* (2006.01)

(52) U.S. Cl.
CPC .............. *H01C 17/06533* (2013.01); *C04B 2235/3225* (2013.01)

(56) References Cited

U.S. PATENT DOCUMENTS

| | | |
|---|---|---|
| 6,204,748 B1 | 3/2001 | Sorg |
| 6,261,480 B1 | 7/2001 | Ogata et al. |
| 9,790,098 B2 * | 10/2017 | Watanabe .............. H01C 7/008 |
| 2002/0020949 A1 | 2/2002 | Kuzuoka et al. |
| 2002/0088965 A1 * | 7/2002 | Ogata ....................... G01K 7/22 252/500 |
| 2006/0020415 A1 | 1/2006 | Hardwicke et al. |
| 2009/0016409 A1 * | 1/2009 | Mizoguchi ......... C01G 45/1264 374/185 |
| 2011/0027587 A1 * | 2/2011 | Poulain .................. H01C 7/045 428/402 |
| 2012/0049996 A1 * | 3/2012 | Kobayashi ............... G01K 7/22 338/22 R |
| 2013/0308683 A1 * | 11/2013 | Ko ......................... H01C 17/20 374/185 |
| 2017/0301437 A1 * | 10/2017 | Yamaguchi ............ H01C 7/008 |

FOREIGN PATENT DOCUMENTS

| | | |
|---|---|---|
| JP | 2006054258 A | 2/2006 |
| JP | 5267860 B2 | 8/2013 |
| WO | 2018235432 A1 | 12/2018 |

OTHER PUBLICATIONS

International Search Report for PCT/JP2019/040840 dated Dec. 24, 2019.
Extended European Search Report with Supplementary Partial European Search Report for EP19879797 dated Nov. 9, 2021.

* cited by examiner

FIG. 5

| SAMPLE No. | CHEMICAL COMPOSITION ||||||||| Cr/Mn | B CONSTANT [K] B25/50 | SPECIFIC RESISTANCE [kΩ·mm] |
|---|---|---|---|---|---|---|---|---|---|---|---|---|
| | BASIC CHEMICAL COMPOSITION [mol%] |||| ADDITIVE [mol%] ||||| | | |
| | Y | Cr | Mn | Ca | Pr | Y | La | Ce | | | |
| 1 | 79.5 | 8.5 | 8.5 | 3.5 | — | — | — | — | 1.0 | 2227 | 16.35 |
| 2 | 79.5 | 8.5 | 8.5 | 3.5 | 1 | — | — | — | 1.0 | 2214 | 33.82 |
| 3 | 79.5 | 8.5 | 8.5 | 3.5 | 3 | — | — | — | 1.0 | 2216 | 68.75 |
| 4 | 79.5 | 8.5 | 8.5 | 3.5 | 5 | — | — | — | 1.0 | 2219 | 133.10 |
| 5 | 79.5 | 8.5 | 8.5 | 3.5 | 10 | — | — | — | 1.0 | 2218 | 476.30 |
| 6 | 81.5 | 6.5 | 8.5 | 3.5 | — | 1 | — | — | 0.76 | 2059 | 38.39 |
| 7 | 81.5 | 6.5 | 8.5 | 3.5 | — | 3 | — | — | 0.76 | 2059 | 54.22 |
| 8 | 81.5 | 6.5 | 8.5 | 3.5 | — | 5 | — | — | 0.76 | 2057 | 127.80 |
| 9 | 81.5 | 6.5 | 8.5 | 3.5 | — | 10 | — | — | 0.76 | 2073 | 207.11 |
| 10 | 79.5 | 8.5 | 8.5 | 3.5 | — | — | 1 | — | 1.0 | 2187 | 17.93 |
| 11 | 79.5 | 8.5 | 8.5 | 3.5 | — | — | 3 | — | 1.0 | 2191 | 16.42 |
| 12 | 79.5 | 8.5 | 8.5 | 3.5 | — | — | 5 | — | 1.0 | 2205 | 15.66 |
| 13 | 79.5 | 8.5 | 8.5 | 3.5 | — | — | 10 | — | 1.0 | 2088 | 3.79 |
| 14 | 79.5 | 8.5 | 8.5 | 3.5 | — | — | — | 1 | 1.0 | 2264 | 32.19 |
| 15 | 79.5 | 8.5 | 8.5 | 3.5 | — | — | — | 3 | 1.0 | 2337 | 51.80 |
| 16 | 79.5 | 8.5 | 8.5 | 3.5 | — | — | — | 5 | 1.0 | 2363 | 65.47 |
| 17 | 79.5 | 8.5 | 8.5 | 3.5 | — | — | — | 10 | 1.0 | 2388 | 75.69 |

FIG. 7

| GROUP | SAMPLE No. | CHEMICAL COMPOSITION [mol%] ||||||| B CONSTANT [K] B25/50 | SPECIFIC RESISTANCE [kΩ·mm] |
|---|---|---|---|---|---|---|---|---|---|---|
| | | BASIC CHEMICAL COMPOSITION [mol%] |||| ADDITIVE [mol%] | Cr/Mn | | |
| | | Y | Cr | Mn | Ca | Pr | | | | |
| A | 18 | 80 | 10 | 6.5 | 3.5 | 0 | 1.5 | 2526 | 100.79 |
| A | 19 | 80 | 10 | 6.5 | 3.5 | 1 | 1.5 | 2530 | 146.14 |
| A | 20 | 80 | 10 | 6.5 | 3.5 | 3 | 1.5 | 2533 | 167.89 |
| A | 21 | 80 | 10 | 6.5 | 3.5 | 5 | 1.5 | 2529 | 209.05 |
| A | 22 | 80 | 10 | 6.5 | 3.5 | 10 | 1.5 | 2524 | 351.56 |
| B | 23 | 80.5 | 7 | 8.5 | 4 | 0 | 0.8 | 2090 | 24.66 |
| B | 24 | 80.5 | 7 | 8.5 | 4 | 1 | 0.8 | 2106 | 75.00 |
| B | 25 | 80.5 | 7 | 8.5 | 4 | 3 | 0.8 | 2084 | 112.10 |
| B | 26 | 80.5 | 7 | 8.5 | 4 | 5 | 0.8 | 2087 | 223.03 |
| B | 27 | 80.5 | 7 | 8.5 | 4 | 10 | 0.8 | 2055 | 440.84 |
| C | 28 | 76 | 18 | 0 | 6 | 0 | — | 1775 | 0.35 |
| C | 29 | 76 | 18 | 0 | 6 | 3 | — | 1783 | 0.70 |
| C | 30 | 76 | 18 | 0 | 6 | 5 | — | 1787 | 1.13 |
| C | 31 | 76 | 18 | 0 | 6 | 16 | — | 1797 | 3.90 |
| C | 32 | 76 | 18 | 0 | 6 | 26 | — | 1773 | 4.09 |

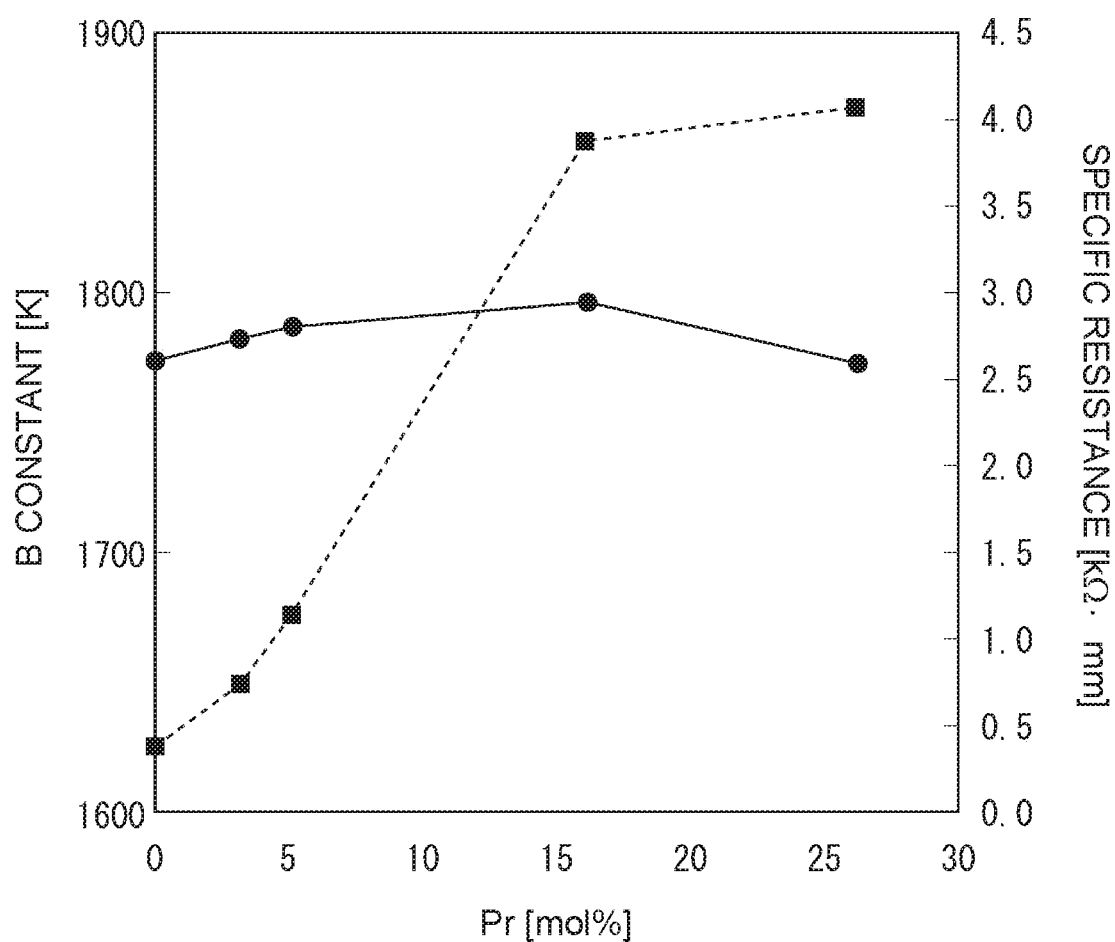

THERMISTOR SINTERED BODY AND TEMPERATURE SENSOR ELEMENT

CROSS-REFERENCE TO RELATED APPLICATIONS

This is a National Stage application of PCT international application PCT/JP2019/040840, filed on Oct. 17, 2019, which claims the priority of Japanese Patent Application No. 2018-204562, filed Oct. 31, 2018, both of which are incorporated herein by reference in their entirety.

FIELD OF THE INVENTION

The present invention relates to a thermistor sintered body that is used for a temperature sensor, and to a temperature sensor element.

BACKGROUND ART

Conventionally, a temperature sensor has been widely used that uses a thermistor of which the electric resistance value (hereinafter simply referred to as resistance value) changes according to a temperature, as a heat sensitive body. The characteristics of the thermistor are generally shown by the resistance value and a temperature coefficient of resistance (temperature dependence of resistance value). The characteristics of the resistance value of the thermistor are different depending on a material constituting the element, and various materials have been developed which show the characteristics of the resistance value according to the purpose of use.

An average temperature coefficient of resistance (hereinafter referred to as B constant) can be obtained by the following expression;

$$B=(lnRm-lnRn)/(1/Tm-1/Tn)$$

Rm: resistance value at temperature Tm
Rn: resistance value at temperature Tn

The thermistor is a substance which detects a temperature on the basis of a change in the resistance value, and, when the resistance value becomes too low, cannot accurately detect the temperature. Accordingly, a thermistor which is used in a wide temperature range is required to have a small B constant.

In addition, as is disclosed in JP 2001-143907 A, for example, it is also required of the thermistor that a change in the resistance value due to a heat history or the like is small, in order that the thermistor detects a temperature over a wide temperature range.

CITATION LIST

Patent Literature

Patent Literature 1: JP 2001-143907 A

SUMMARY OF INVENTION

Technical Problem

In a temperature sensor, it is necessary to adjust the B constant and the resistance value R, according to a range of a temperature to be detected. Specifically, when the detection temperature range is wide, it is required that the B constant is low and the resistance value is not too small. In addition, when the detection temperature range is narrow, it is required to enhance the B constant, enhance also the resistance value, and enhance the sensitivity.

As described above, the numerical values required of the B constant and the resistance value R are different depending on the detection temperature range, an object to be detected and a detecting location, and accordingly the B constant and the resistance value R need to be adjusted.

However, when a temperature range of an object to be detected is wider, the resistance value R also decreases significantly in a process of lowering the B constant. Because of this, the amount of an insulating material to be added necessarily increases, and it becomes difficult to stably adjust the B constant/resistance value R.

Then, an object of the present invention is to provide a thermistor sintered body and a temperature sensor element that can adjust the resistance value in a wider range while suppressing the influence on the B constant.

Solution to Problem

A thermistor sintered body of the present invention is configured to be a sintered body including: a $Y_2O_3$ phase as a main phase; and a $Y(Cr/Mn)O_3$ phase as a subphase, wherein a chemical composition of Cr, Mn, Ca, Pr and Y excluding oxygen includes one or two of Cr: 20 mol % or less and Mn: 20 mol % or less, Ca: 1 to 15 mol %, and Pr: 0.5 to 30 mol %, with the balance being unavoidable impurities and Y.

The $Y(Cr/Mn)O_3$ phase which represents the subphase of the present invention is a $Y(Cr,Mn)O_3$ phase or a $YCrO_3$ phase, and Pr is dissolved in the $Y(Cr,Mn)O_3$ phase.

In the thermistor sintered body of the present invention, preferably, the subphase is the $Y(Cr,Mn)O_3$ phase; and the chemical composition of Cr, Mn, Ca, Pr and Y excluding oxygen includes Cr: 3 to 15 mol %, Mn: 7 to 12 mol %, Ca: 2 to 7 mol %, and Pr: 0.5 to 15 mol %, with the balance being unavoidable impurities and Y.

In addition, in the thermistor sintered body of the present invention, preferably, the subphase is the $YCrO_3$ phase; and the chemical composition of Cr, Mn, Ca, Pr and Y excluding oxygen includes Cr: 3 to 15 mol %, Mn: 7 to 12 mol %, Ca: 2 to 8 mol %, and Pr: 0.5 to 30 mol %, with the balance being unavoidable impurities and Y.

In these thermistor sintered bodies of the present invention, preferably, a standard deviation of the B constant is 5 [k] or less, and a standard deviation of a specific resistance is 100 [k$\Omega$·mm] or more.

The present invention provides a temperature sensor element including: a heat sensitive body; a pair of lead wires configured to be electrically connected to the heat sensitive body, and a protective layer configured to cover the heat sensitive body, wherein the heat sensitive body includes any one of the thermistor sintered bodies described above.

Advantageous Effects of Invention

According to the present invention, a thermistor sintered body formed of a sintered body that includes a $Y_2O_3$ phase and a $Y(Cr/Mn)O_3$ phase further includes a predetermined amount of Pr, and thereby can adjust its resistance value while suppressing an influence giving on the B constant.

BRIEF DESCRIPTION OF THE DRAWINGS

FIG. 5 is a table showing chemical compositions of thermistor sintered bodies in Example 1;

FIG. 7 is a table showing chemical compositions of thermistor sintered bodies in Example 2;

FIG. 10 is a graph showing a relationship of the amount of Pr with the B constant and a relationship thereof with the specific resistance, in Group C of Example 2.

DETAILED DESCRIPTION OF THE PREFERRED EMBODIMENTS

Hereinafter, embodiments of the present invention will be described with reference to the accompanying drawings.

Figure 1:
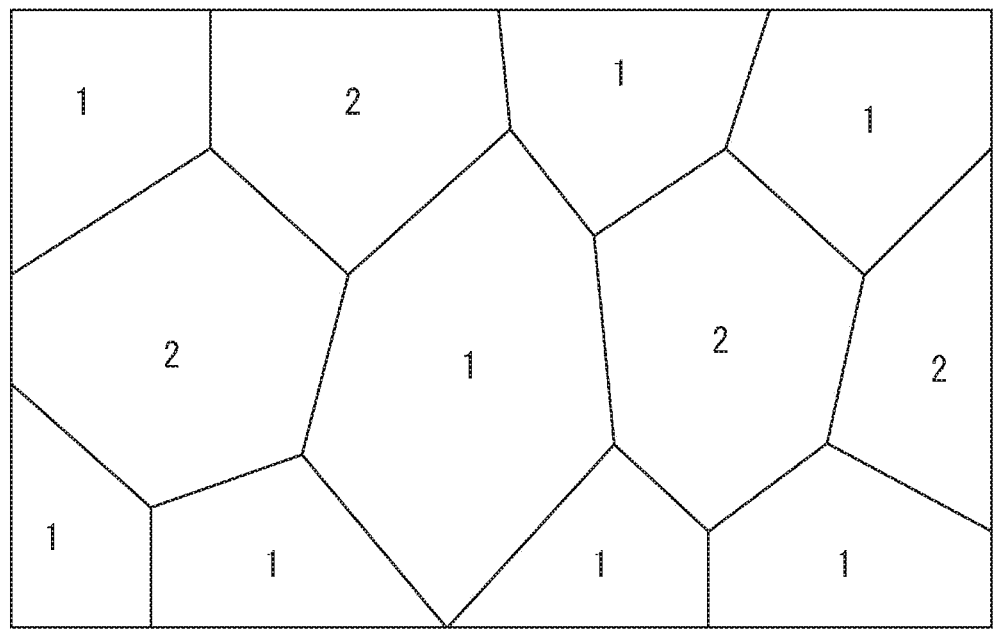
FIG. 1A and FIG. 1B each show a structure of a thermistor sintered body according to an embodiment of the present invention, FIG. 1A being a figure schematically showing the structure, and FIG. 1B being a table showing analysis results of chemical compositions of a $Y_2O_3$ phase and a $Y(Cr,Mn)O_3$ phase.

As is shown in FIG. 1A, a thermistor sintered body according to the present embodiment is an oxide sintered body formed of a composite structure that includes a $Y_2O_3$ phase and a $Y(Cr,Mn)O_3$ phase.

The $Y_2O_3$ phase has a property of an electrical insulator, and gives an influence on a resistance value of the thermistor sintered body. In addition, the $Y(Cr,Mn)O_3$ phase has a property of a semiconductor and gives an influence on a B constant of the thermistor sintered body. Here, the $Y(Cr,Mn)O_3$ phase will be described, but this is only one form of $Y(Cr/Mn)O_3$. In the present invention, the $YCrO_3$ phase can be used as an alternative to the $Y(Cr,Mn)O_3$ phase.

The thermistor sintered body according to the present embodiment forms a sintered body structure that has the $Y_2O_3$ phase of which the resistance value and the B constant are high, and the $Y(Cr,Mn)O_3$ phase of which the resistance value and the B constant are low. In the thermistor sintered body, the $Y_2O_3$ phase constitutes more than the $Y(Cr,Mn)O_3$ phase; and the $Y_2O_3$ phase constitutes more than 50 vol % to 90 vol %, and the $Y(Cr,Mn)O_3$ phase constitutes the balance (10 vol % to less than 50 vol %).

The thermistor sintered body according to the present embodiment typically forms a sea-island structure, and forms a composite structure in which the $Y(Cr,Mn)O_3$ phase forming a subphase is dispersed in the $Y_2O_3$ phase forming a main phase. In the thermistor sintered body, the $Y_2O_3$ phase preferably constitutes 60 to 90 vol % thereof, and more preferably constitutes 65 to 75 vol % thereof.

When the thermistor sintered body according to the present embodiment forms the sea-island structure, there is a case where the grain boundaries cannot be clearly identified, but the $Y_2O_3$ phase has an average grain size (d50) of approximately 0.5 to 30 μm, and the $Y(Cr,Mn)O_3$ phase has an average grain size of approximately 1.0 to 10 μm.

Each of the compositions of the $Y_2O_3$ phase and the $Y(Cr,Mn)O_3$ phase in the thermistor sintered body according to the present embodiment has been analyzed.

The results are shown in FIG. 1B, and it has been confirmed that Ca is dissolved in the $Y(Cr,Mn)O_3$ phase. It is understood that Ca is dissolved in the $Y(Cr,Mn)O_3$ phase and thereby contributes to the lowering of the B constant of the $Y(Cr,Mn)O_3$ phase. In addition, it is understood as is shown in FIG. 1B that Pr also contributes to enhancement of the resistance value of the $Y(Cr,Mn)O_3$ phase, by being dissolved in the $Y(Cr,Mn)O_3$ phase.

The thermistor sintered body according to the present embodiment includes the $Y_2O_3$ phase and the $Y(Cr,Mn)O_3$ phase; and the chemical composition of Cr, Mn, Ca, Pr and Y excluding oxygen includes one or two of Cr: 20 mol % or less and Mn: 20 mol % or less, Ca: 1 to 15 mol %, and Pr: 0.5 to 30 mol %, with the balance being unavoidable impurities and Y. The thermistor sintered body according to the present embodiment has features in that the thermistor sintered body contains Pr which has been added. In this composition range, when the thermistor sintered body includes both of Cr and Mn, the $Y(Cr,Mn)O_3$ phase forms a subphase, and when the thermistor sintered body includes only Cr between Cr and Mn, the $YCrO_3$ phase forms the subphase.

In the present invention, when the $Y(Cr,Mn)O_3$ phase or the $YCrO_3$ phase forms the subphase, the thermistor sintered body can suppress the variation of the B constant with respect to an amount of increase in the specific resistance ρ accompanying the increase in the amount of Pr.

When the $Y(Cr,Mn)O_3$ phase forms the subphase, a preferable range of Cr is 3 to 15 mol %, and a more preferable range of Cr is 5 to 12 mol %.

When the $Y(Cr,Mn)O_3$ phase forms the subphase, a preferable range of Mn is 7 to 12 mol %, and more preferably is 8 to 11 mol %.

When the $YCrO_3$ phase forms the subphase, a preferable range of Cr is 10 to 20 mol %, and a more preferable range of Cr is 16 to 20 mol %.

Ca has a function of lowering the B constant of the thermistor sintered body by dissolving in the $Y(Cr,Mn)O_3$ phase or the $YCrO_3$ phase. A preferable range of Ca is 2 to 8 mol %, and a more preferable range of Ca is 3 to 5 mol %.

Pr is an element effective in obtaining an effect of the present invention, specifically, an effect of capable of adjusting the resistance value while suppressing the influence on the B constant. A preferable range of Pr is 1 to 25 mol %, a more preferable range of Pr is 3 to 15 mol %, and a further preferable range is 3 to 10 mol %.

Here, to suppress the influence on the B constant means that a change of the B constant is small even when the amount of Pr has increased.

[Method for Producing Thermistor Sintered Body]

Next, one example of a method for producing the thermistor sintered body will be described with reference to FIG. 2.

Figure 2:
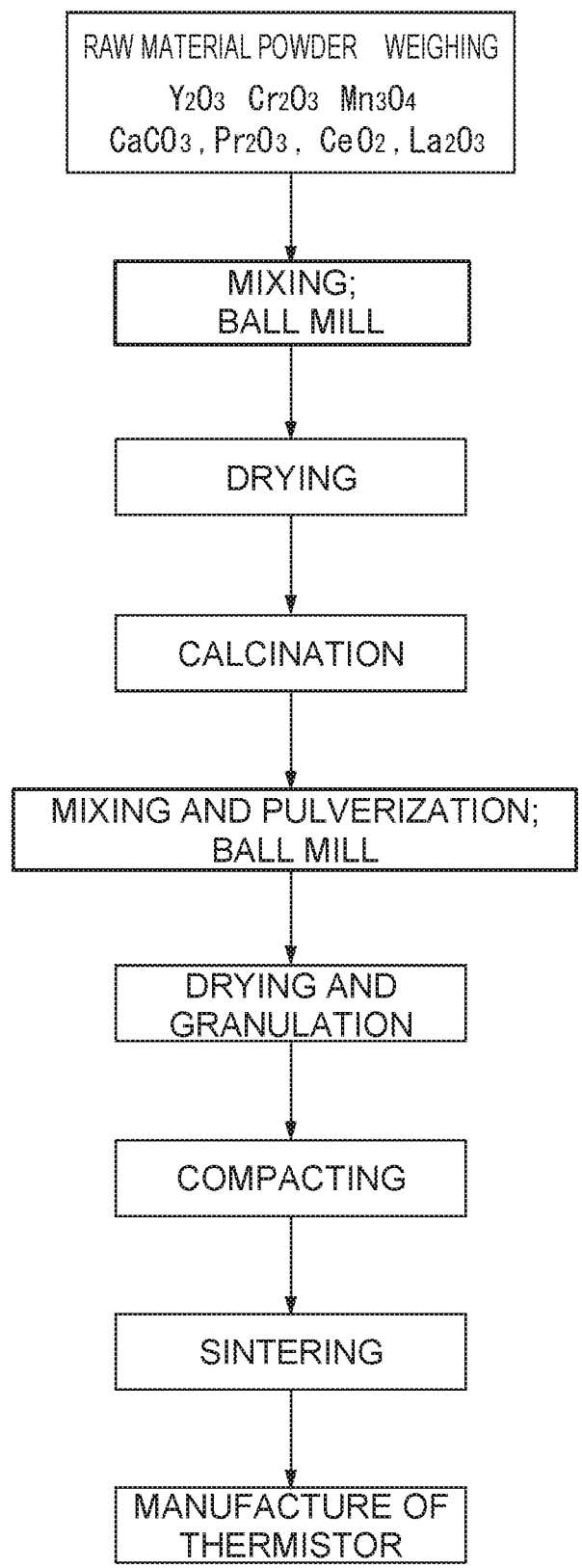
FIG. 2 is a flowchart showing one example of a production procedure of the thermistor sintered body according to the present embodiment.

As is shown in FIG. 2, the production method in the present embodiment includes steps of weighing raw material powders, mixing the raw material powders, drying the raw material powders, calcination, mixing/pulverization after calcination, drying/granulation, compacting and sintering. Hereinafter, each step will be sequentially described.

[Weighing of Raw Material Powder]

In the present embodiment, the raw material powders shall be an yttrium oxide ($Y_2O_3$) powder, a praseodymium oxide ($Pr_2O_3$) powder, a chromium oxide ($Cr_2O_3$) powder, a manganese oxide (MnO, $Mn_2O_3$, $Mn_3O_4$ and the like) powder, and a $CaCO_3$ powder.

The above raw material powders are weighed so as to form the above described chemical composition.

The $Y_2O_3$ powder contributes to the formation of the $Y_2O_3$ phase, and the $Y_2O_3$ powder, the $Pr_2O_3$ powder, the $Cr_2O_3$ powder and the $Mn_3O_4$ powder contribute to the formation of the $Y(Cr,Mn)O_3$ phase, the $YCrO_3$ phase or the $YMnO_3$ phase, in other words the $Y(Cr/Mn)O_3$ phase. The $CaCO_3$ powder functions as a sintering aid, and in addition, contributes to the lowering of the B constant by dissolving in the $Y(Cr,Mn)O_3$ phase, the $YCrO_3$ phase or the $YMnO_3$ phase in a form of Ca. In addition, Pr is also dissolved in the $Y(Cr,Mn)O_3$ phase or the $YCrO_3$ phase, and thereby contributes to adjustment, for example, enhancement of the resistance value of the $Y(Cr,Mn)O_3$ phase, the $YCrO_3$ phase or the $YMnO_3$ phase.

The raw material powder has a purity of 98% or more, preferably 99% or more, more preferably 99.9% or more, in order to obtain a thermistor sintered body having high characteristics.

The particle size of the raw material powder is not limited as long as the calcination proceeds, but can be selected in a range of 0.1 to 6.0 μm by an average particle size (d50).

[Mixing of Raw Material Powder; Ball Mill]

Predetermined amounts of the $Y_2O_3$ powder, the $Pr_2O_3$ powder, the $Cr_2O_3$ powder, the $Mn_3O_4$ powder and the $CaCO_3$ powder are weighed, and are mixed. The mixing can be performed, for example, by a procedure of converting the mixed powder into a slurry state by addition of water, and mixing the slurry by a ball mill. For the mixture, a mixer other than a ball mill can also be used.

When it is intended to obtain the $Y(Cr,Mn)O_3$ phase as the subphase, both of the $Cr_2O_3$ powder and the $Mn_3O_4$ powder are used as raw materials. In addition, when it is intended to obtain the $YCrO_3$ phase as the subphase, the $Mn_3O_4$ powder is not used as the raw material, but the $Cr_2O_3$ powder is used.

[Drying of Raw Material Powder]

It is preferable to dry and granulate the slurry after the mixture, with a spray dryer or other equipment, and to form a mixed powder for calcination.

[Calcination]

The mixed powder for calcination after drying is calcined. By the calcination, a calcined body which has a composite structure of the $Y_2O_3$ phase and the $Y(Cr,Mn)O_3$ phase is obtained from the $Y_2O_3$ powder, the $Pr_2O_3$ powder, the $Cr_2O_3$ powder, the $Mn_3O_4$ powder and the $CaCO_3$ powder.

The calcination is performed by a procedure of, for example, charging the mixed powder for calcination into a crucible, and holding the mixed powder in a temperature range of 800 to 1300° C. in the air. If the calcination temperature is lower than 800° C., the formation of the composite structure is insufficient, and if the calcination temperature exceeds 1300° C., there is a possibility that the sintering density decreases and the stability of the resistance value decreases. For this reason, the holding temperature for calcination is set in a range of 800 to 1300° C.

The holding time period in the calcination should be appropriately set according to the holding temperature, but when the holding temperature is in the above temperature range, the purpose of the calcination can be achieved by a holding time period of approximately 0.5 to 100 hours.

[Mixing and Pulverization; Ball Mill]

The powder after the calcination is mixed and pulverized. The mixture and pulverization can be performed by a procedure of converting the powder after the calcination into a slurry state by addition of water, and mixing the slurry by a ball mill, in the same manner as in the procedure before the calcination.

[Drying and Granulation]

It is preferable to dry and granulate the powder after the pulverization, by a spray dryer or other equipment.

[Compaction]

The granulated powder after the calcination is compacted into a predetermined shape.

For compacting, press compacting with the use of a die, and besides a cold isostatic press (CIP) can be used.

The higher the density of the compacted body is, the higher density of a sintered body easily obtains; and accordingly, it is desirable to enhance the density of the compacted body as highly as possible. For that purpose, it is preferable to use CIP which can obtain the high density.

[Sintering]

Next, the obtained compacted body is sintered.

The sintering is performed by a procedure of holding the temperature range of 1400 to 1650° C. in the air. If the sintering temperature is lower than 1400° C., the formation of the composite structure is insufficient; and if the sintering temperature exceeds 1650° C., the sintered body melts, and/or a reaction occurs with a sintering crucible and/or the like. The holding time period in the sintering should be appropriately set according to the holding temperature, but when the holding temperature is in the above temperature range, a dense sintered body can be obtained by a holding time period of approximately 0.5 to 200 hours.

It is preferable to subject the obtained thermistor sintered body to annealing, in order to stabilize the characteristics of the thermistor. The thermistor sintered body is annealed by being held, for example, at 1000° C. in the air.

[Temperature Sensor Element]

A specific example of a temperature sensor element 10 will be described to which the thermistor sintered body obtained in the above way is applied.

Figure 3A:
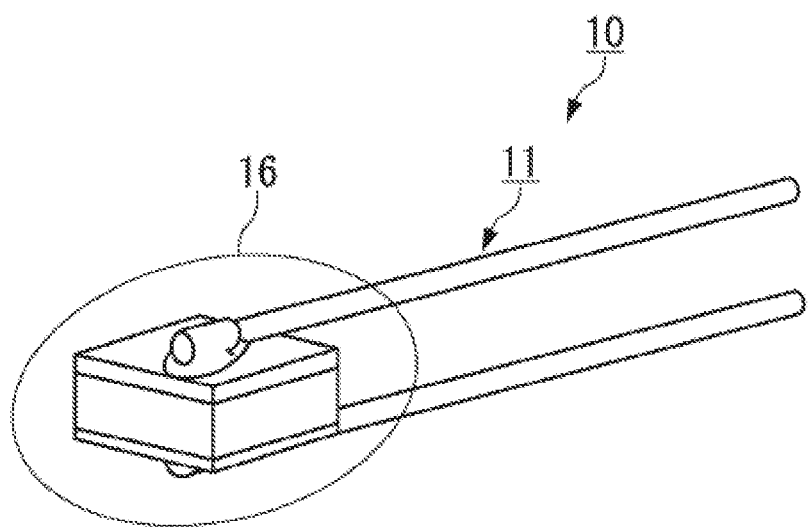
FIG. 3A and FIG. 3B are each a perspective view showing one example of a temperature sensor element that uses the thermistor sintered body according to the present embodiment.

The temperature sensor element 10 includes an element body 11 and a protective layer 16, as is shown in FIG. 3A.

The element body 11 is used together with a detection circuit for extracting a change of a resistance value as a change of voltage, thereby detects a temperature of an environment in which the element body 11 is placed, and generates a temperature detection signal formed of an electrical signal.

The protective layer 16 seals the element body 11 to keep the element body 11 in an airtight state, thereby prevents the occurrence, particularly, of chemical and physical changes of the thermistor sintered body, on the basis of the environmental conditions, and also mechanically protects the element body 11.

Figure 3B:
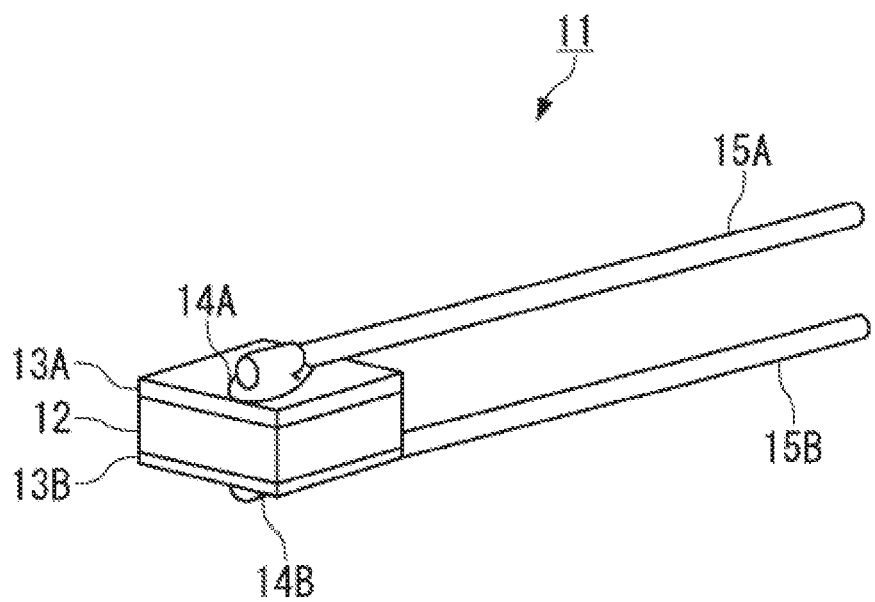

As is shown in FIG. 3B, the element body 11 in this example includes: a heat sensitive body 12 formed of a tabular thermistor sintered body; electrodes 13A and 13B; connection electrodes 14A and 14B; and lead wires 15A and 15B.

The electrodes 13A and 13B are each formed into a film shape on the whole area of both of top and bottom surfaces of the plate-like thermistor sintered body. The electrodes 13A and 13B are formed from platinum (Pt) or another noble metal.

The electrodes 13A and 13B are formed as a thick film or a thin film. The thick film electrodes 13A and 13B are formed by applying a paste which has been produced by mixing an organic binder with a platinum powder, onto both of the top and bottom surfaces of the thermistor sintered body, and by drying and then sintering the paste. On the other hand, the thin film electrode can be formed by vacuum vapor deposition or sputtering.

The thermistor sintered body on which the electrodes 13A and 13B have been formed is worked into a predetermined dimension.

The connection electrodes 14A and 14B are formed of metal films which are formed on the surfaces of the electrodes 13A and 13B, respectively. The connection electrodes 14A and 14B are also formed from platinum (Pt) or another noble metal.

One end sides of the lead wires 15A and 15B are electrically and mechanically connected to the electrodes 13A and 13B via the connection electrodes 14A and 14B, respectively. The other end sides of the lead wires 15A and 15B are connected to an external detection circuit. The lead wires 15A and 15B are formed of a wire material which has heat resistance and is formed from, for example, platinum or an alloy of platinum and iridium (Ir).

The lead wires 15A and 15B are connected to the electrodes 13A and 13B, in the following way.

A paste containing a platinum powder which will form the connection electrodes 14A and 14B is applied to each of one end sides of the lead wires 15A and 15B beforehand. The platinum paste is dried in a state in which the respective sides of the lead wires 15A and 15B, on which the platinum paste has been applied, are brought into contact with the electrodes 13A and 13B, and then the platinum powder is sintered.

For the protective layer 16 shown in FIG. 3A, a glass can be used which contains, for one example, $SiO_2$, CaO, SrO, BaO, $Al_2O_3$ and $SnO_2$ as the raw materials. By such glass, the element body 11 and the one end sides of the lead wires 15A and 15B are sealed.

A method for sealing the thermistor sintered body and the like by the protective layer 16 can be arbitrarily selected; but it is possible to seal the thermistor sintered body and the like by covering the thermistor sintered body and the like with, for example, a glass tube which is made from glass and becomes the protective layer 16, and then by melting the glass tube.

It is preferable that the temperature sensor element 10 is subjected to annealing treatment, after having been sealed by glass and cooled. Due to this annealing treatment, it becomes possible to prevent the resistance of the element body 11 from decreasing.

Next, another embodiment of the temperature sensor element 20 will be described with reference to FIG. 4.

Figure 4A:
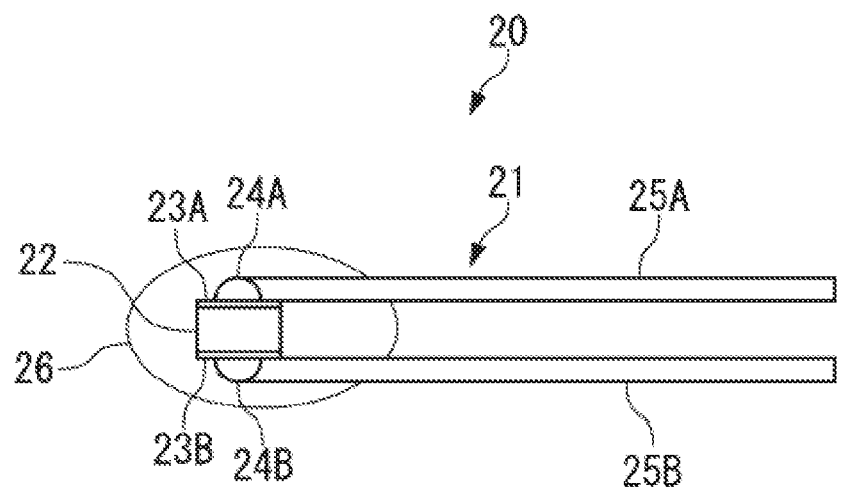
FIG. 4A is a perspective view showing another example of a temperature sensor element that uses the thermistor sintered body according to the present embodiment.

The temperature sensor element 20 includes an element body 21 and a protective layer 26, and is similar in appearance to the temperature sensor element 10, as is shown in FIG. 4A. The element body 21 and the protective layer 26 have the same functions as the element body 11 and the protective layer 16 of the temperature sensor element 10, respectively.

As is shown in FIG. 4A, the element body 21 in this example includes: a tabular thermistor sintered body; electrodes 23A and 23B; connection electrodes 24A and 24B; and lead wires 25A and 25B.

The element body 21 has features in portions of the thermistor sintered body and the electrodes 23A and 23B, as compared with the element body 11. As is shown in the middle stage of FIG. 4B, in the element body 21, the thermistor sintered body and the electrodes 23A and 23B constitute a thermistor chip 33. The thermistor chip 33 is manufactured in the following way.

Into the previously described pulverized calcined powder, for example, an ethyl cellulose-based binder is mixed, and the mixture is compacted into a sheet shape. The conditions of the calcination are as previously described.

Next, a predetermined dimension of the sheet is punched from the compacted sheet, and is sintered. The conditions of the sintering are as previously described. Then, a wafer obtained by sintering is polished, and a wafer 31 is obtained which is formed of a thermistor sintered body with a predetermined thickness, as is shown in the middle stage of FIG. 4B. After that, a paste for forming an electrode is applied to both of the top and bottom surfaces of the polished wafer 31 (thermistor sintered body) by printing, and then sintered; and a wafer 30 is obtained on which electrode films have been formed. An electro-conductive material to be contained in the paste is selected from platinum (Pt) and other noble metals. When the platinum has been selected, the sintering is performed at approximately 1300° C. After that, the wafer 30 is cut so as to become a predetermined dimension, as is shown in the middle stage of FIG. 4B, and thereby the thermistor chip 33 is obtained which has the film-like electrodes 23A and 23B formed on the top and bottom surfaces, respectively.

Figure 4B:
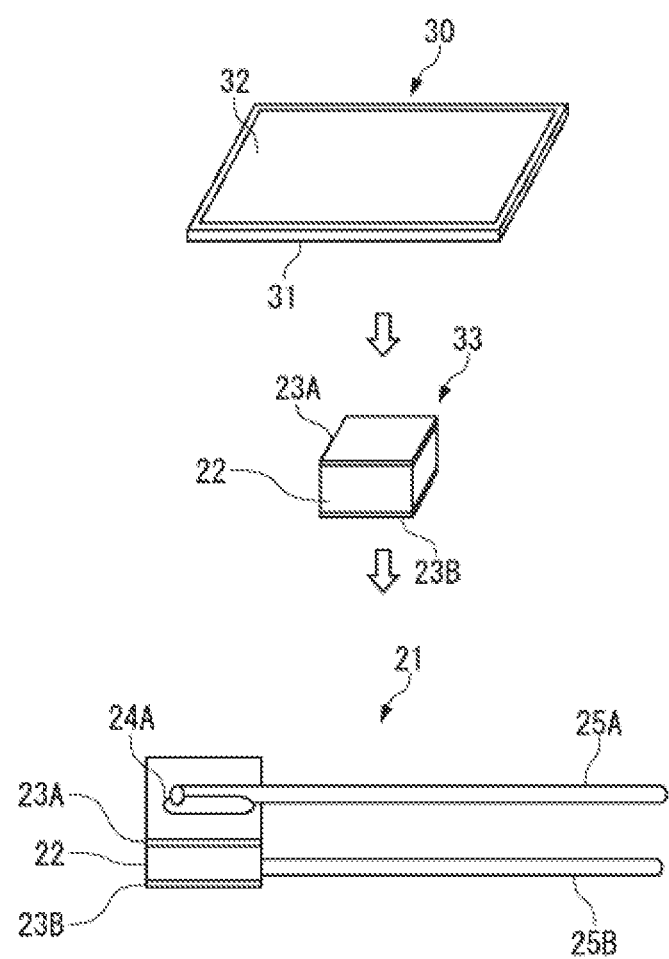
FIG. 4B is a figure showing the outline of the manufacturing procedure.

Next, the lead wires 25A and 25B are joined on to the electrodes 23A and 23B on both of the top and bottom surfaces of the thermistor sintered body, respectively, with the use of a Pt paste, then the resultant thermistor sintered body is subjected to baking treatment to have the connection electrodes 24A and 24B formed thereon, and the element body 21 shown in the lower stage of FIG. 4B is manufactured.

Next, the protective layer 26 is formed; and for the protective layer 26, the previously described glass can be used, or a covering material can also be used which is formed of a constituent material similar to the thermistor sintered body.

Example 1

Next, the thermistor sintered body of the present invention will be described on the basis of Examples.

Raw material powders having the following average particle sizes were prepared, and thermistor sintered bodies having various compositions shown in FIG. 5 were produced according to the above described production steps. In these thermistor sintered bodies, both of Cr and Mn were contained in the $Y(Cr,Mn)O_3$ phase. In this table, No. 1 shows the basic composition in the present Example, which does not contain rare earths other than Y; Nos. 2 to 5 are samples containing Pr; Nos. 6 to 9 are samples containing Y; Nos. 10 to 13 are samples containing La; and Nos. 14 to 17 are samples containing Ce.

The samples were calcined under conditions of 1000° C. for 24 hours, and then were sintered under conditions of 1500° C. for 24 hours, both in the air.

$Y_2O_3$ powder: 0.1 µm  
$La_2O_3$ powder: 0.1 µm  
$CeO_2$ powder: 0.1 µm  
$Mn_3O_4$ powder: 5.0 µm  
$CaCO_3$ powder: 2.0 µm  
$Pr_2O_3$ powder: 0.1 µm  
$Cr_2O_3$ powder: 2.0 µm The B constants and the specific resistances were determined for each of the obtained sintered bodies. The results are shown in FIG. 6. Note that the B constant shows values between 25° C. and 50° C. (B25/50).

Figure 6A:
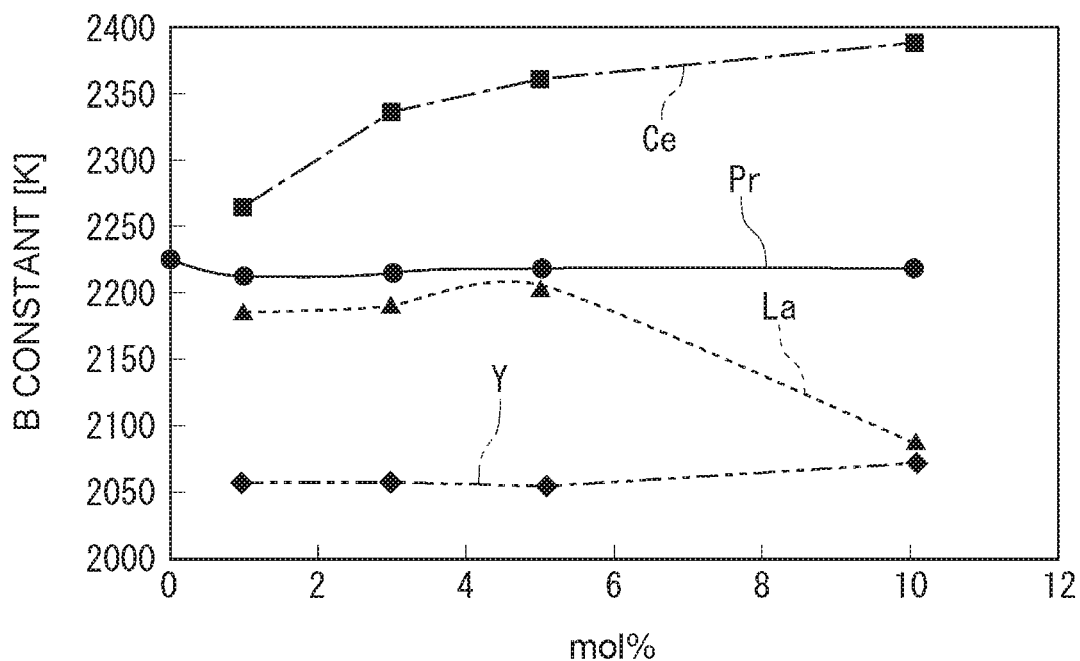
FIG. 6A is a graph showing a relationship between an amount of an additive element and a B constant in Example 1.
Figure 6B:
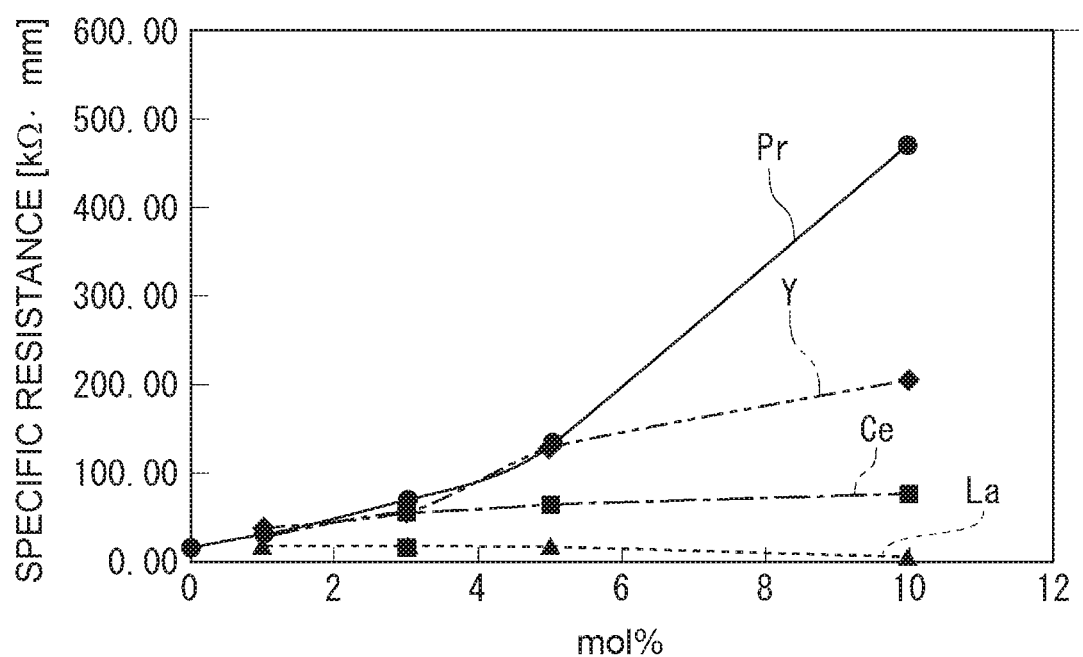
FIG. 6B is a graph showing a relationship between the amount of the additive element and a specific resistance in Example 1.

As is shown in FIG. 6A and FIG. 6B, the variation of the B constant with respect to an amount of increase in the specific resistance ρ is less in the thermistor sintered body containing Pr than in the thermistor sintered body containing Y. In addition, in the thermistor sintered body containing Y, when the amount of added Y becomes 10 mol %, the B constant also starts increasing. However, in the case of Pr, even when 10 mol % has been added, the increase of the B constant is not observed, and the thermistor sintered body containing Pr can adjust the specific resistance ρ while suppressing an influence on the B constant.

In addition, as is shown in FIG. 6A and FIG. 6B, in the thermistor sintered body containing La, the specific resistance ρ decreases as the B constant decreases, and in the thermistor sintered body containing Ce, the specific resistance ρ increases as the B constant increases. Here, La and Ce are exemplified, but there are also other elements in which the B constant and the specific resistance ρ vary together.

For the thermistor sintered body containing Pr, the standard deviation of the B constant and the standard deviation of the specific resistance were determined. As a result, the standard deviation of the B constant was 4.44 [k], which is not more than 5 [k], and the standard deviation of the specific resistance was 170 [kΩ·mm], which is not less than 100 [kΩ·mm]. On the other hand, in the case of the sintered body including Y, the standard deviation of the B constant and the standard deviation of the specific resistance were 6.4 [k] and 67 [kΩ·mm], respectively.

Example 2

Next, thermistor sintered bodies having various compositions shown in FIG. 7 were produced. The used raw material powders and the production steps are the same as those in Example 1. In FIG. 7, Group A and Group B show thermistor sintered bodies which contain the Y(Cr,Mn)O$_3$ phase as a subphase similarly to those in Example 1, but the basic chemical composition excluding Pr is different from that in Example 1. In addition, in FIG. 7, Group C shows thermistor sintered bodies which contain a YCrO$_3$ phase as a subphase.

The B constants of the respective obtained sintered bodies were determined in the same manner as in Example 1. The results are shown in FIG. 8 (Group A), FIG. 9 (Group B) and FIG. 10 (Group C).

Figure 8:
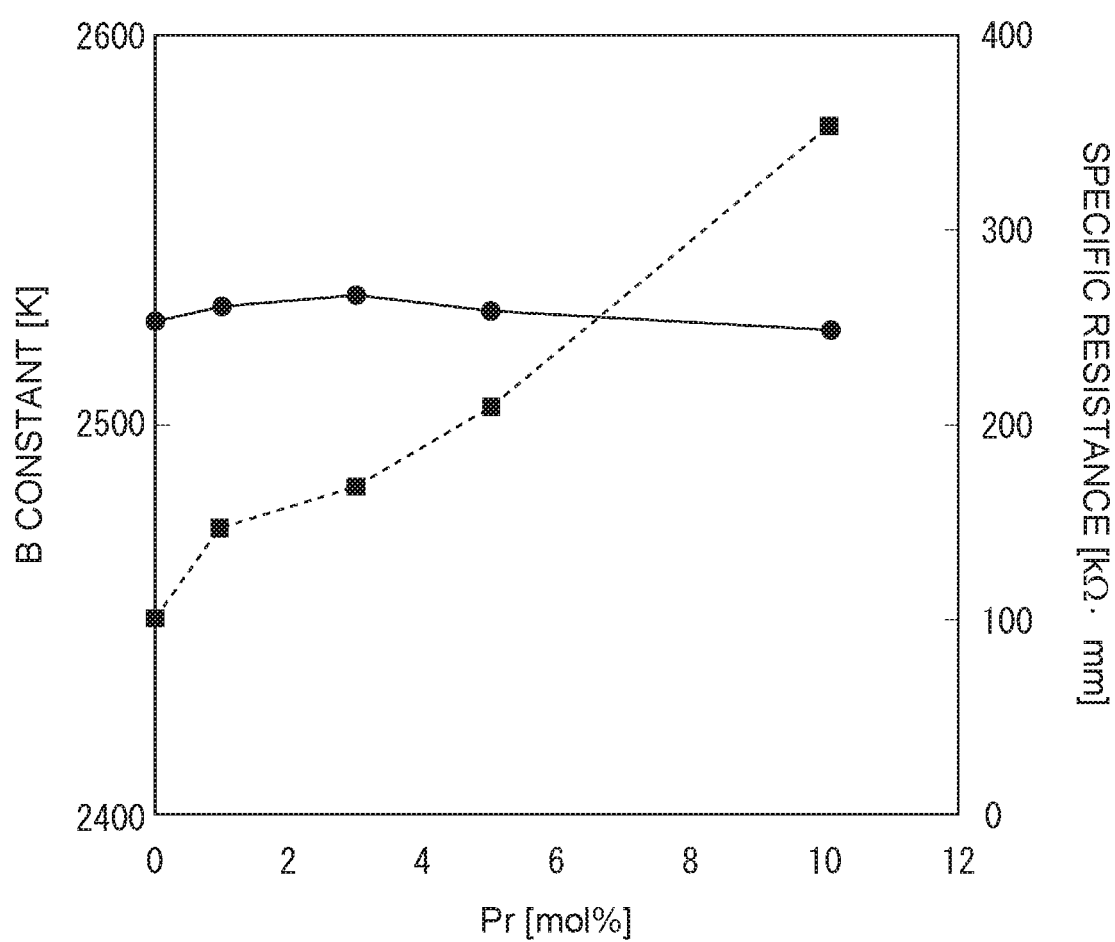
FIG. 8 is a graph showing a relationship of an amount of Pr with the B constant and a relationship thereof with a specific resistance, in Group A of Example 2.
Figure 9:
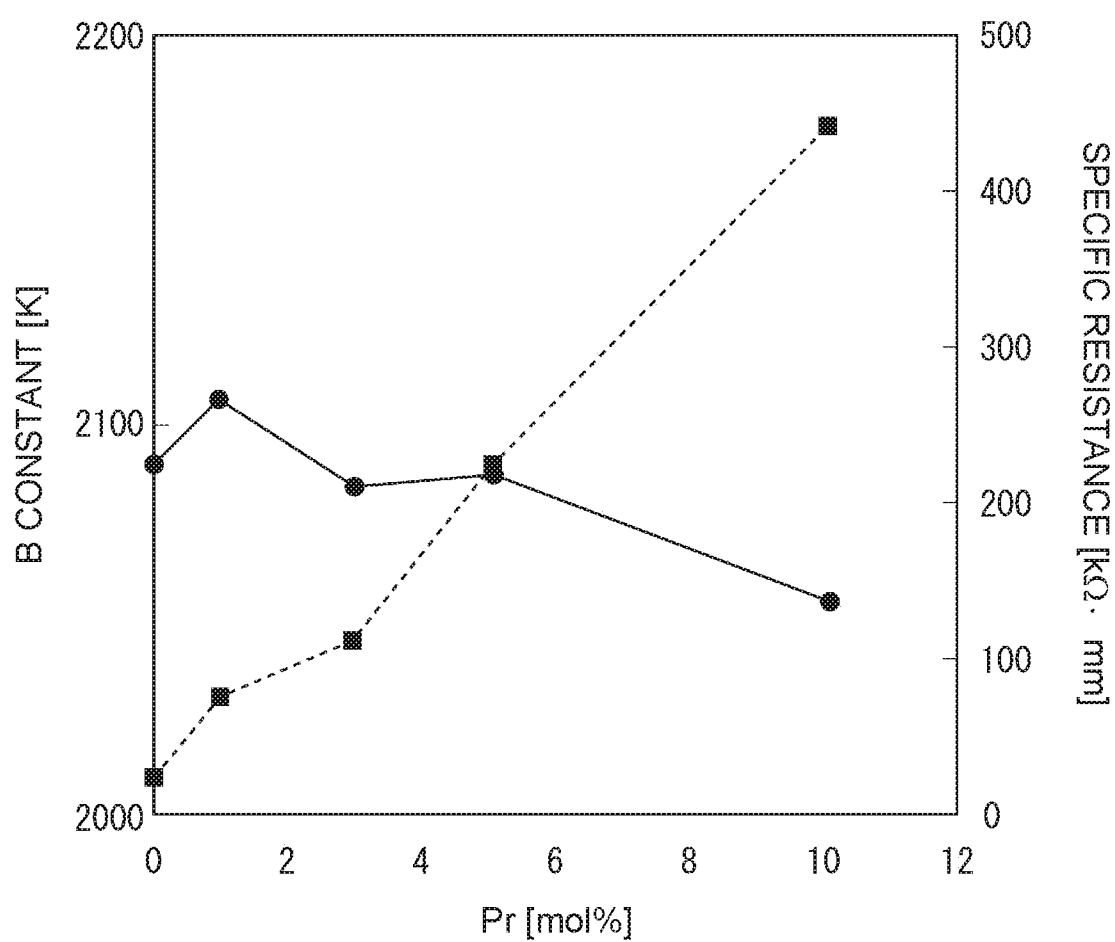
FIG. 9 is a graph showing a relationship of the amount of Pr with the B constant and a relationship thereof with the specific resistance, in Group B of Example 2.

As is shown in FIG. 8 and FIG. 9, in the thermistor sintered bodies that contain Pr and in which the Y(Cr,Mn)O$_3$ phase forms the subphase, the variation of the B constant is small, compared to the amount of increase of the specific resistance ρ accompanying an increase in the amount of Pr, similarly to that in Example 1.

In addition, as is shown in FIG. 10, in the thermistor sintered bodies that contain Pr and in which the YCrO$_3$ phase forms the subphase, the variation of the B constant is small, compared to the amount of increase of the specific resistance ρ accompanying an increase in the amount of Pr, similarly to that in Example 1.

According to Example 1 and Example 2 described above, an effect that the resistance value can be adjusted without giving an influence on the B constant, due to Pr being contained, is exhibited in a case where the thermistor sintered body contains the Y$_2$O$_3$ phase as the main phase, and in addition contains the Y(Cr,Mn)O$_3$ phase or the YCrO$_3$ phase as the subphase.

The present invention has been described above on the basis of the preferred embodiments and Examples, but the configurations included in the above described embodiments can be selected, or be appropriately changed to other configurations, insofar as they do not deviate from the scope of the invention.

When Y$_2$O$_3$ is used and perovskite compounds ABO$_3$ of a semiconductor phase are used for adjusting the resistance value, which are proven to show good results in the adjustment, in the form of the perovskite compounds ABO$_3$, elements for the site A include Mg, Ca, Sr, Ba, La, Ce, Nd, Pm, Sm, Yb, Lu, and the like, and elements for the site B include Ti, V, Fe, Co, Ni, Cu, Al, and the like. The resistance values of these compounds are adjusted by the Y$_2$O$_3$ similarly to the present invention, and the present invention can be applied also to the compounds.

The thermistor sintered body and the thermistor of the present invention can be used over a wide temperature range from −50° C. to approximately 1200° C., and accordingly can be widely used as a temperature sensor for automotive exhaust-gas treatment devices, and for the temperature measurement of a high temperature in a water heater, a boiler, an oven range, a stove and the like.

In addition, it is preferable that the thermistor sintered body of the present invention is formed of only a crystal structure of the orthorhombic crystal system, but it is not excluded that a crystal structure of the hexagonal crystal system exists. As long as the characteristics of the present invention can be obtained, even when a trace amount of the crystal structure of the hexagonal crystal system is included in the crystal structure of the orthorhombic crystal system, the thermistor sintered body corresponds to the thermistor sintered body of the present invention.

REFERENCE SIGNS LIST

1 Y$_2$O$_3$ phase
2 Y(Cr,Mn)O$_3$ phase
10 and 20 temperature sensor element
11 and 21 element body
12 heat sensitive body
13A, 13B, 23A and 23B electrode
14A, 14B, 24A and 24B connection electrode
15A, 15B, 25A and 25B lead wire
16 and 26 protective layer
31 wafer
33 thermistor chip

What is claimed is:
1. A thermistor sintered body comprising:
Y$_2$O$_3$ phase as a main phase;
a Y(Cr/Mn)O$_3$ phase as a subphase; and
a chemical composition of Cr, Mn, Ca, Pr and Y, excluding oxygen, comprising:
one or two both of Cr: 3 to 20 mol % and Mn: 0 to 20 mol %, Ca: 1 to 15 mol %, and Pr: 0.5 to 30 mol %, with the balance being unavoidable impurities and Y,
wherein the subphase is a Y(Cr,Mn)O$_3$ phase or a YCrO$_3$ phase, and Pr is dissolved in the Y(Cr,Mn)O$_3$ phase or the YCrO$_3$ phase.
2. A temperature sensor element comprising:
a heat sensitive body;
a pair of lead wires configured to be electrically connected to the heat sensitive body; and a protective layer configured to cover the heat sensitive body, wherein the heat sensitive body comprises the thermistor sintered body according to claim 1.

3. A thermistor sintered body comprising:

$Y_2O_3$ phase as a main phase;

a $Y(Cr,Mn)O_3$ phase as a subphase; wherein Pr is dissolved in the $Y(Cr,Mn)O_3$ subphase; and a chemical composition of Cr, Mn, Ca, Pr and Y, excluding oxygen,. comprising Cr: 3 to 15 mol %, Mn: 7 to 12 mol %, Ca: 2 to 7 mol %, and Pr: 0.5 to 15 mol %, with the balance being unavoidable impurities and Y.

4. The thermistor sintered body according to claim 3, wherein a standard deviation of a B constant is 5 [k] or less, and a standard deviation of a specific resistance is 100 [kΩ·mm] or more.

5. A temperature sensor element comprising:

a heat sensitive body;

a pair of lead wires configured to be electrically connected to the heat sensitive body; and a protective layer configured to cover the heat sensitive body, wherein the heat sensitive body comprises the thermistor sintered body according to claim 4.

6. A temperature sensor element comprising:

a heat sensitive body;

a pair of lead wires configured to be electrically connected to the heat sensitive body; and a protective layer configured to cover the heat sensitive body, wherein the heat sensitive body comprises the thermistor sintered body according to claim 3.

7. A thermistor sintered body comprising:

$Y_2O_3$ phase as a main phase;

a $YCrO_3$ phase as a subphase, wherein Pr is dissolved in the $YCrO_3$ phase; and a chemical composition of Cr, Ca, Pr and Y, excluding oxygen, comprising Cr: 10 to 20 mol %, Ca: 2 to 8 mol %, and Pr: 0.5 to 30 mol %, with the balance being unavoidable impurities and Y.

8. The thermistor sintered body according to claim 7, wherein a standard deviation of a B constant is 5 [k] or less, and a standard deviation of a specific resistance is 100 [kΩ·mm] or more.

9. A temperature sensor element comprising:

a heat sensitive body;

a pair of lead wires configured to be electrically connected to the heat sensitive body; and a protective layer configured to cover the heat sensitive body, wherein the heat sensitive body comprises the thermistor sintered body according to claim 7.

* * * * *